Dec. 12, 1933.    M. J. TRUMBLE ET AL    1,938,877
APPARATUS FOR CRACKING HYDROCARBONS
Filed Nov. 1, 1930    2 Sheets-Sheet 1
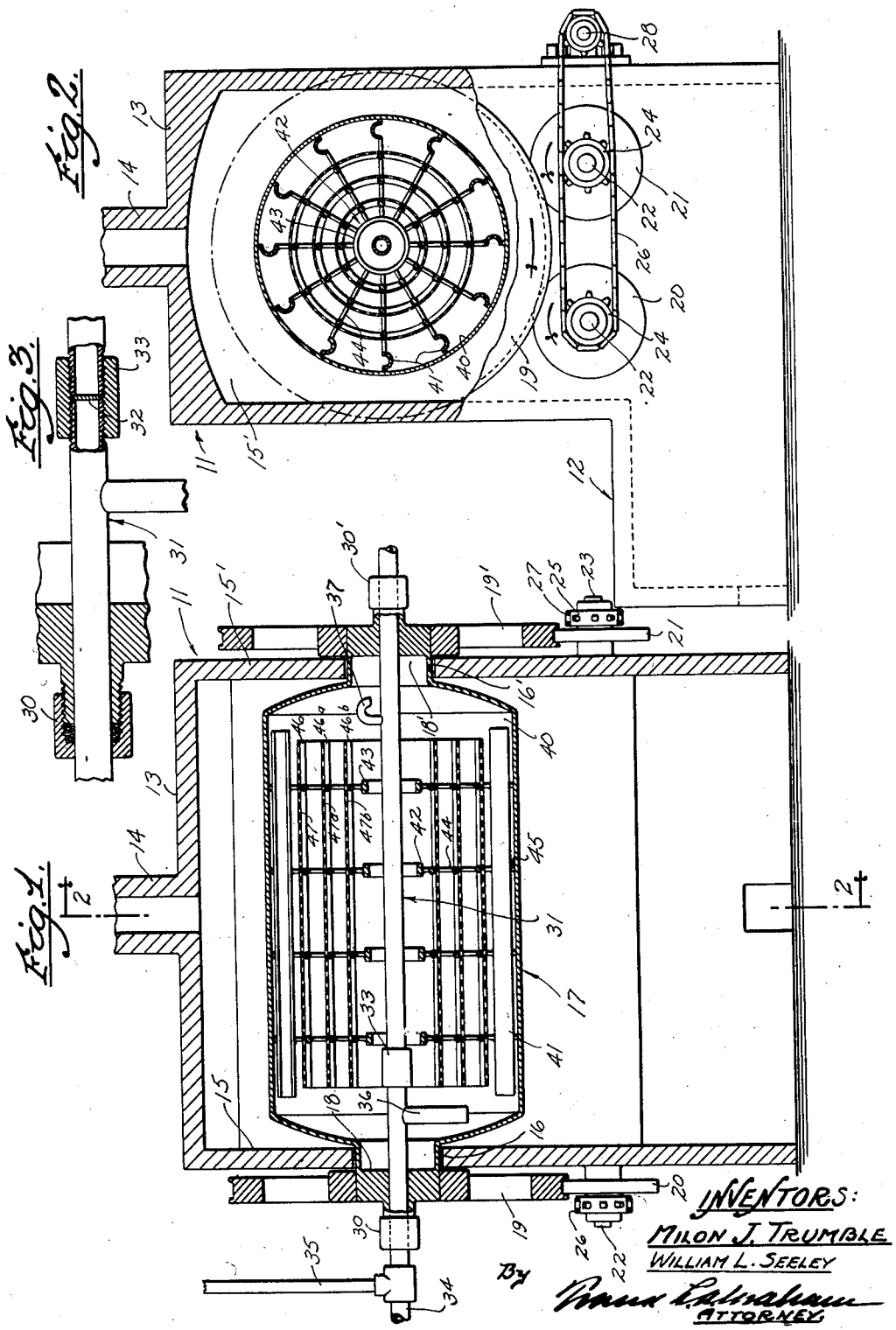
INVENTORS:
MILON J. TRUMBLE
WILLIAM L. SEELEY
ATTORNEY

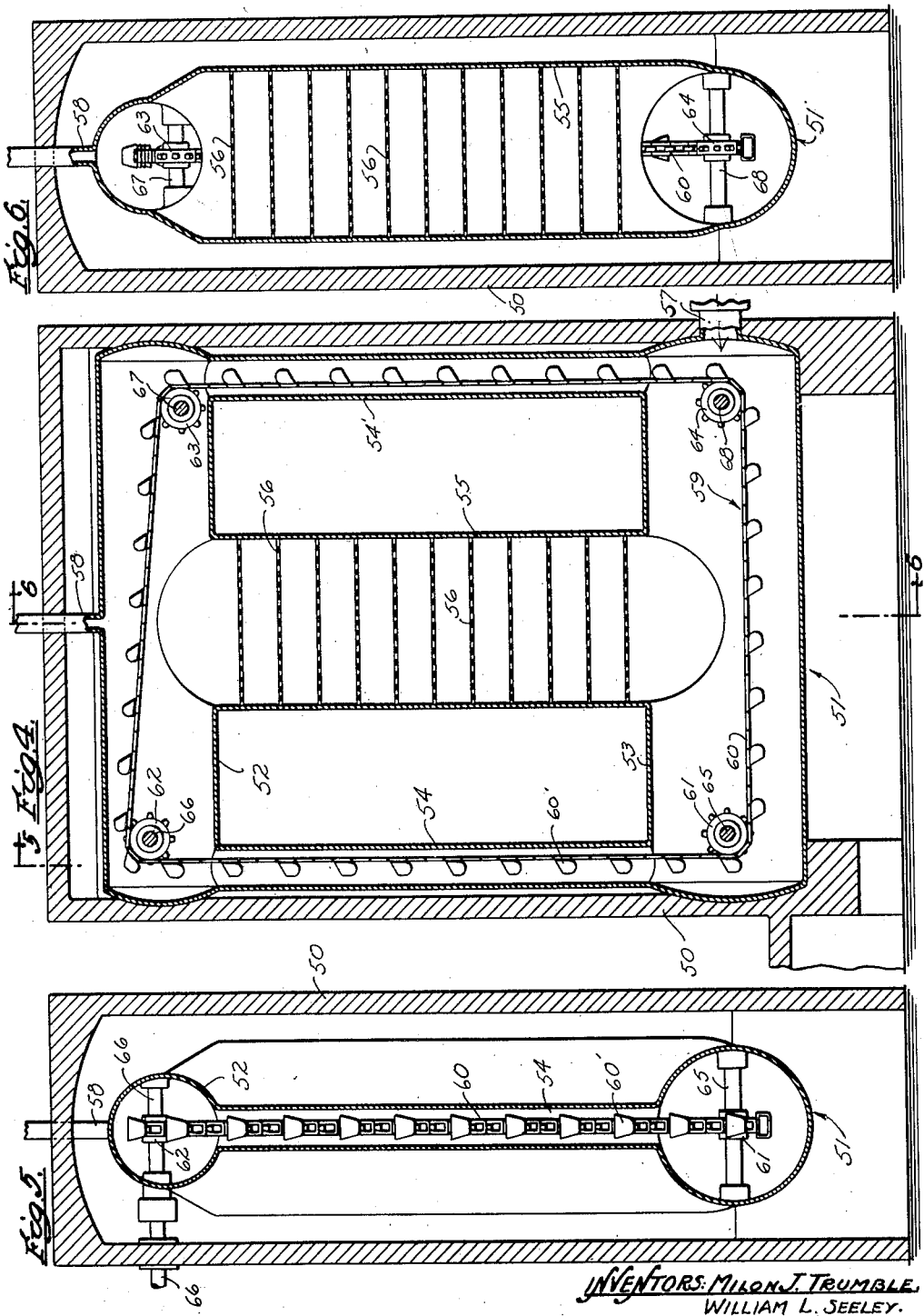

Patented Dec. 12, 1933

1,938,877

UNITED STATES PATENT OFFICE 1,938,877

APPARATUS FOR CRACKING HYDROCARBONS

Milon J. Trumble, Alhambra, and William L. Seeley, Los Angeles, Calif., assignors to Petroleum Hydrogenation Co., Ltd., a corporation of Nevada Application November 1, 1930. Serial No. 492,666

6 Claims. (Cl. 196—53)

This invention has to do in a general way with processes and apparatus for treating hydrocarbons, such as mineral oil, and is more particularly related to a process and apparatus for cracking vapors of heavy mineral oil fractions to produce fractions of low boiling point, such as gasoline.

It is the primary object of this invention to produce a process of the class described and an apparatus for effecting the process, wherein a catalytic agent is used for the purpose of accelerating the cracking reaction. We are aware of the fact that various types of catalysts have been used with varying degrees of success for the purpose of accelerating the cracking or decomposition of hydrocarbons. So far as we are aware the processes employing catalysts have entailed the use of a solid member, such as a plate composed of a catalytic metal, or the hydrocarbon is passed over a bath of molten catalytic metal such as lead, and in all of these processes it has been found that the exposed surface of the catalytic material quickly becomes poisoned or inactive as a catalyst, rendering the same useless in accelerating the cracking process.

It is an important object of this invention to produce a process of the class described wherein the hydrocarbon material is in intimate contact with minute particles of catalytic material during the entire period over which it is subjected to the process.

It is a further object of this invention to provide means for continuously cleaning the catalyst while the process is in operation.

Another important object of this invention is to produce a process wherein the cracking reaction is accomplished by hydrogenating reaction which discourages the formation of unsaturated hydrocarbons and also retards the formation of carbon.

The method contemplated by this invention consists in a general way of first mixing the hot hydrocarbon vapors with hydrogen, which is preferably in the nascent state. This mixture of vapors and hydrogen is then introduced into a heated chamber or retort where it is passed through what may be described as a spray of catalytic material. The mixture of vapors and hydrogen is also passed over a body or bath of catalytic material and through or between a series of baffles or baffle screens which are composed of catalytic metal. The temperature and the treatment under which the process is carried out depends entirely upon the quality of the material being used and the quality of the product which is to be produced. As mentioned above, it is preferable that the hydrocarbons being treated be in the vapor stage while passing through the retort or cracking chamber and the cracked vapors are removed from the chamber and subjected to condensation or dephlegmation in the usual manner.

In the development of the process contemplated by this invention it has been found that various catalysts may be used with varying degrees of efficiency. Probably the most satisfactory catalyst is molten lead, the retort or cracking still having a bath of molten lead on the bottom portion thereof and being provided with means for continually lifting a portion of the lead toward the top of the retort and pouring it downwardly therethrough. The spray effect mentioned above is accelerated by employing a series of screen baffles upon which the molten lead falls and breaks up into a fine spray. We have also found that under certain conditions the cracking reaction is improved by mixing nickel oxide with the lead bath.

Other catalysts such as platinum shot, beryllium shot and nickel may also be employed in the process. In the event a solid catalyst in the form of shot is used, the baffle screens effect a cleaning action on the shot and at the same time tend to disperse the same through the chamber so that the vapors passing therethrough come in intimate contact with the catalytic material.

Various types of apparatus may be used in carrying out the process contemplated by this invention, and in the accompanying drawings we have shown two preferred forms of apparatus which are particularly well adapted to the process contemplated by this invention.

Referring more particularly to the drawings,

Fig. 1 is a sectional elevation of a preferred form of apparatus contemplated by this invention;

Fig. 2 is a sectional elevation taken in a plane represented by the line 2—2 in Fig. 1;

Fig. 3 is an enlarged partial elevational view with parts broken away showing details in the construction of the inlet and outlet conduits used in that form of our invention shown in Fig. 1;

Fig. 4 is a sectional elevation of a modified form of apparatus contemplated by this invention;

Fig. 5 is an elevational view taken in a plane represented by the line 5—5 in Fig. 4; and Fig. 6 is an elevational view taken in a plane represented by the line 6—6 in Fig. 4.

More particularly describing the invention as herein illustrated, reference numeral 11 indicates a furnace having a fire box 12, a top 13 which is provided with a stack 14, and end walls 15 and 15'. The end walls 15 and 15' are provided with oppositely disposed aligned apertures 16 and 16'. Reference numeral 17 indicates a rotary still which has end projections 18 and 18' extending through the apertures in the walls. Reference numerals 19 and 19' indicate supporting wheels which are rigidly mounted upon the projecting portions 18 and 18' and are supported by means of sets of rollers indicated by reference numerals 20 and 21.

The rollers 20 and 21 may be supported in any suitable manner, such as by means of shafts 22 and 23 which are shown as being secured to the end walls of the furnace and these rollers are adapted to be driven by means of sprocket wheels 24 and 25 which are operated by means of sprocket chains 26 and 27, the chains being driven through the medium of a shaft 28 from any suitable source of power, not shown.

The ends of the projecting portions 18 and 18' are provided with packing glands 30 and 30' through which a pipe 31 extends. The pipe 31 serves both as an inlet and an outlet for the vapors delivered to and from the still. In order to be successfully operated for this purpose the pipe is shown in Fig. 3 as being provided with a partition diaphragm 32 which is preferably put in place by cutting the pipe and rejoining the sections thereof by means of a collar 33.

Reference numeral 34 indicates what may be termed an oil vapor inlet, and reference numeral 35 indicates the hydrogen inlet. Reference numeral 36 indicates a downwardly projecting inlet spout through which the mixture of vapor and hydrogen is introduced into the still 17, and reference numeral 37 indicates a U-shaped outlet spout through which the cracked vapors pass into the pipe 31 through which they are delivered from the still.

Reference numeral 40 indicates a bath or body of catalytic material, such as molten lead, and it was previously mentioned in the specification as an object of this invention to subject the vapors passing through the still to the action of a spray of finely divided catalytic material and to produce in the apparatus means for carrying out this step. This operation was also described in a general way as comprising the step of lifting a part of the catalytic material toward the top of the still and pouring it downwardly through a series of baffles or baffle screens for the purpose of subdividing the catalytic material.

In the form of our invention shown in Figs. 1 and 2, this step is effected by providing on the inner wall of the still a series of trough members indicated by reference numeral 41. These troughs may be made in the form of half cylindrical tubes such as are formed by splitting an ordinary piece of pipe, and are secured to the inner wall of the still in any suitable manner. In the form of our invention shown in these two figures, the still is shown as being provided with a plurality of parallel spiders indicated by reference numeral 42, which consist of ring members 43 situated near the central portion of the still, and radiating spokes 44 which extend radially from the ring members and have their outer ends secured to the wall of the still as indicated at 45. The trough members 41 are shown as being secured to the spokes 44 and are supported thereby. The spokes 44 are also shown as supporting a plurality of bars 46, 46a and 46b, which in turn form the supporting means for a plurality of concentric baffle screens 47, 47a and 47b. During the operation of the still the catalytic material is carried toward the upper portion of the still and is poured downwardly in a manner such that it passes through the baffle screens, which are also composed of a catalytic metal, such as a suitable nickel alloy, the screen acting to subdivide the metal thereby forming a spray in the chamber through which the vapors must pass.

The operation of the apparatus shown in Figs. 1 and 2 will no doubt be apparent from the foregoing description. Suffice to say that the still is revolved by means of the rollers 20 and 21 and the wheels 19 and 19' at a comparatively slow speed, the mixture of vapor and hydrogen being introduced into the still through the pipes 34 and 35 respectively.

With regard to the hydrogen used, it is quite important for the most successful operation of this process, that the hydrogen be in the nascent state, and it has been found in the development of this process that a satisfactory hydrogenating material can be produced by passing super heated steam through carbon at a very high temperature.

In Figs. 4 to 6 inclusive, we show a modified form of apparatus which may be used in carrying out the process contemplated by this invention. This apparatus consists in a general way of a furnace or refractory housing 50 which encloses a distilling or cracking unit generally indicated by reference numeral 51. The unit 51 comprises a pair of vertically spaced shells 52 and 53 which are connected through end pipes 54 and 54' and a relatively large central shell 55. The central shell 55 contains a plurality of vertically spaced baffle screens 56 which, like the screens described in connection with Figs. 1 and 2, are composed of catalytic material. The bottom shell 53 is provided with an inlet pipe 57 through which the vapors or mixture of vapors and hydrogen are admitted to the still, and the upper shell 52 is provided with an outlet pipe 58 through which the cracked vapors are emitted from the still.

Reference numeral 59 indicates a bath or body of catalytic material which is positioned in the bottom portion of the lower shell 53, and reference numeral 60 indicates a bucket chain which runs over sprockets 61, 62, 63 and 64. These sprockets are mounted on shafts 65, 66, 67 and 68, and are driven by a main drive shaft indicated in Fig. 5 by reference numeral 66. During the operation of this apparatus the catalytic material in the bottom of the still is picked up by the buckets 60' on the bucket chain 60 and is carried into the upper shell 52 where it is poured downwardly into the central shell 55 where it passes over the baffle screens and is broken up and subdivided to form a fine spray with which the vapors passing through the shell 55 must intermingle.

In both forms of our invention it will be apparent that the thermal efficiency of the process is greatly increased through the movement of the heated catalytic material and the hot troughs or buckets, together with the heated screens, (Figs. 1 and 2), into the upper region of the cracking zone. The intimate admixture of the vapors with the catalytic material greatly accelerates the cracking reaction so that the process is in all respects very efficient.

It is to be understood that while we have herein described and illustrated two forms of apparatus by which the process may be carried out, that other modifications might be made without impairing the process. For example, a pump might be employed in conjunction with an atomizer or group of atomizers to circulate the molten catalyst in a unit such as is shown in Figs. 4 to 6 inclusive. It is emphasized, therefore, that while we have shown and described certain forms of apparatus and have referred to certain specific catalysts which are particularly suited to this process, the invention is not limited to the precise terms of the above description, but includes within its scope whatever changes fairly come within the spirit of the appended claims.

We claim as our invention:

1. An apparatus for cracking hydrocarbon vapors embodying: a rotary still; means for rotating said still; a body of catalytic material in the bottom portion of said still; means for delivering uncracked vapors into said still; means for lifting said catalytic material toward the top of said still and pouring same downwardly through the vapors in said still; and means for discharging the cracked vapors from said still.

2. An apparatus for cracking hydrocarbon vapors embodying: a rotary still; means for rotating said still about a substantially horizontal axis; a body of catalytic material in the bottom portion of said still; means for delivering uncracked vapors into said still; means comprising troughs attached to the inner walls of said still for lifting said catalytic material toward the top of said still and pouring same downwardly through the vapors in said still; and means for discharging the cracked vapors from said still.

3. An apparatus for cracking hydrocarbon vapors embodying: a rotary still; means for rotating said still about a substantially horizontal axis; a body of catalytic material in the bottom portion of said still; means for delivering uncracked vapors into said still; means for lifting said catalytic material toward the top of said still and pouring same downwardly through the vapors in said still; baffle screens in said still for subdividing the catalytic material falling downwardly therethrough; and means for discharging the cracked vapors from said still.

4. An apparatus for cracking hydrocarbon vapors embodying: a rotary still; means for rotating said still about a substantially horizontal axis; a body of catalytic material in the bottom portion of said still; means for delivering uncracked vapors into said still; means for lifting said catalytic material toward the top of said still and pouring same downwardly through the vapors in said still; a cylindrical baffle screen in said still for subdividing the catalytic material falling downwardly therethrough; and means for discharging the cracked vapors from said still.

5. An apparatus for cracking hydrocarbon vapors embodying: a rotary still; means for rotating said still; a body of catalytic material in the bottom portion of said still; means for delivering uncracked vapors into said still; means for lifting said catalytic material toward the top of said still and pouring same downwardly through the vapors in said still; a cylindrical catalytic baffle screen in said still for sub-dividing the catalytic material falling downwardly therethrough; and means for discharging the cracked vapors from said still.

6. An apparatus for cracking hydrocarbon vapors embodying: a rotary still; means for rotating said still about a substantially horizontal axis; a body of catalytic material in the bottom portion of said still; means for delivering uncracked vapors into said still; means comprising troughs attached to the inner wall of said still for lifting said catalytic material toward the top of said still and pouring same downwardly through the vapors in said still; a catalytic baffle screen in said still for subdividing the catalytic material falling downwardly therethrough; and means for discharging the cracked vapors from said still.

MILON J. TRUMBLE.
WILLIAM L. SEELEY.